April 18, 1967  E. B. RAYMOND  3,315,128
REMOTE INSTRUMENT AND BATTERY CHARGER CONTROL
FOR STORAGE BATTERIES
Filed Sept. 7, 1965

INVENTOR.
EUGENE B. RAYMOND
BY
Edward C. Sheedy
HIS ATTORNEY.

United States Patent Office 3,315,128
Patented Apr. 18, 1967

3,315,128
REMOTE INSTRUMENT AND BATTERY CHARGER CONTROL FOR STORAGE BATTERIES
Eugene B. Raymond, 5041 W. Grove St., Skokie, Ill. 60076
Filed Sept. 7, 1965, Ser. No. 485,393
3 Claims. (Cl. 317—99)

As a principal object of my invention is the provision of an instrument case related to a charger housing in a manner such that the instrument case may be adjusted at various angles with respect to the charger housing whereby to position the wall of the casing carrying the indicator and controls in the most convenient position for reading and operation by the operator.

Another and equally important object is a provision in a remote instrument and charger control of a handle which serves the dual purpose providing convenient means for lifting the instrument and battery charger when moved about as well as means for adjusting the instrument case relative to the charger housing to dispose the indicators and control in the most convenient position for reading and operation by the operator.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
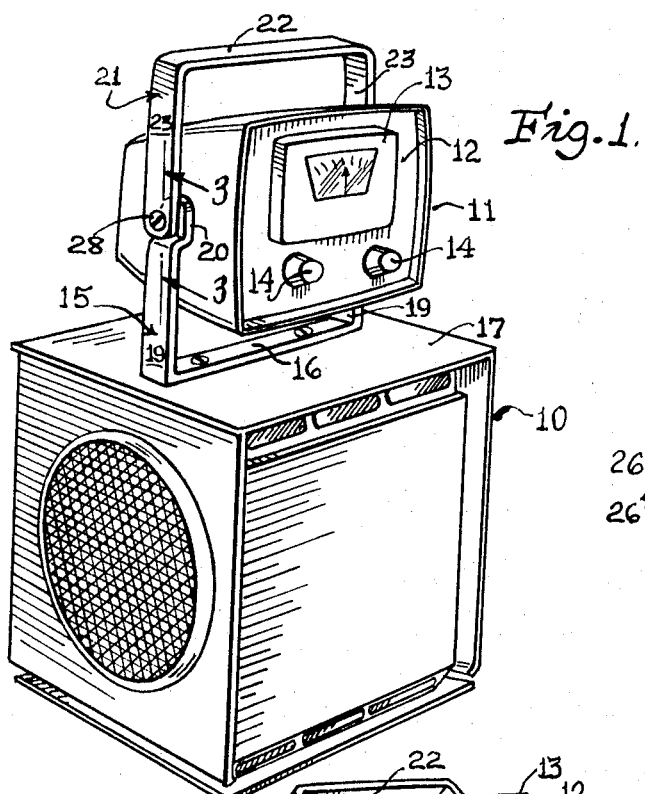
FIG. 1 is a perspective view of the invention.
Figure 3:
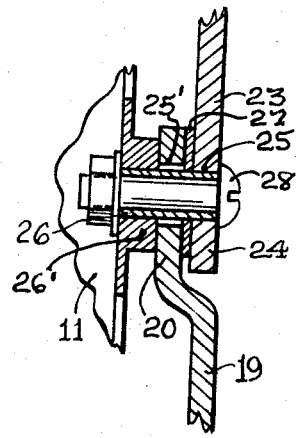
FIG. 3 is a fragmentary sectional detail view taken substantially on line 3—3 of FIG. 1.
Figure 2:
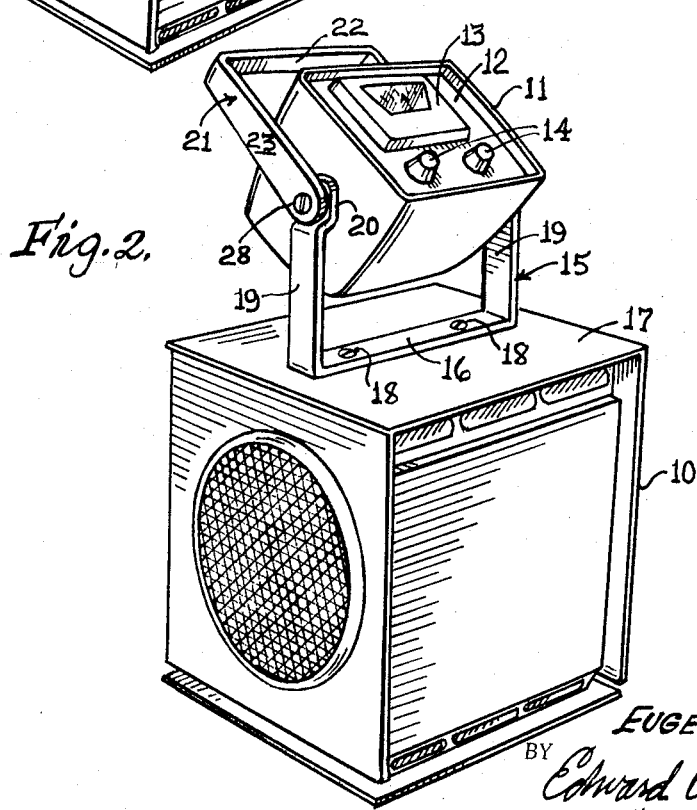
FIG. 2 is a perspective view similar to FIG. 1 but showing the instrument case in an angular adjusted position with respect to the charger housing.

The preferred form of construction of my invention is shown in the drawings in which 10 indicates a charger housing and 11 an instrument case. On the wall 12 of the case 11 is an indicator 13 and controls 14, both of conventional design and construction.

A support is indicated at 15. This support includes a bight portion 16 which is fixedly secured to the top wall 17 of the housing 10 by means of nut-bearing bolts 18. The arms 19 of the support 15 extend in spaced parallel relation with respect to each other. The outer end portions 20 of the arms 19 are preferably offset inwardly, as shown.

A substantially U-shaped handle 21 includes a bight portion 22 and opposite parallelly extending spaced apart arms 23, the end portions 24 of which overlap the end portions 20 of the arms 19. Such overlapping end portions 24 and 20 of the arms 23 and 19, respectively, are provided with aligned openings 25 and 25', respectively, through which is positioned a sleeve 26. The sleeve 26 is fixedly secured to the arms 23 and to the wall 26' of the case 11 in a manner such that pivotal movement of the handle 21 will impart pivotal movement to the case 11.

Between the overlapping arms 23 and 19 is arranged a washer element 27. The sleeve 26 loosely fits in the opening 25' formed in the end portion 20 of the arm 19 so as to permit the sleeve to rotate within the opening 25' when the handle 21 and case 11 are adjusted relative to the housing 10.

To complete the invention, a nut-bearing retainer bolt 28 is positioned in the sleeve 26. In use the handle 21 has a two-fold purupose. It may be used for the purpose of carrying the charger housing and instrument case 11. Also, adjusting the handle 21 relative of the housing 10, the instrument case may be adjusted to dispose the wall 12 thereof in the most desirable position permitting convenient and unobstructed reading of the indicator and to dispose the controls 14 in position within easy reach of the operator.

An important feature of my invention is the fact that the act of lifting the apparatus serves to automatically position the wall 12 in a vertical plane in a position where the indicator 13 and controls 14 cannot be damaged by falling objects such as tools or the like when the apparatus is placed in storage awaiting future use.

It is intended that the handle 21 be of a length such as will not require the user to bend or stoop down to grasp the same. As the front wall will be in a vertical position when the apparatus is not in use, water, dirt, or the like will drop or drain therefrom.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An instrument case carried by a portable housing for a battery charger including
    (a) a stationary support adapted to be carried by and extending upwardly from the top wall of the battery charger housing,
    (b) an instrument case mounted on a handle for said support,
    (c) a handle connected to said case and said support,
    (d) means for fixedly connecting the handle to said case and pivotally interconnecting said case and said handle to said support for unitary rotation about a horizontal axis relative to said support for displaying said instrument case at various angular positions with respect to the portable housing.

2. An instrument case as defined by claim 1 wherein said handle is substantially U-shaped so as to embrace said instrument case with its opposite arms having their end portions overlapping corresponding opposite end portions of the support carried by the top wall of the housing, and means for fixedly connecting said opposite end portions of said arms of the handle to said instrument case.

3. An instrument case as defined by claim 1 wherein the means for connecting said handle to said case and to said support includes a sleeve fixedly connecting each of the end portions of said handle to said case and wherein each of the corresponding end portions of said support provides an opening in which said sleeve is loosely fitted to permit simultaneous rotation of said handle and said case relative to said support, and a nut-bearing retainer bolt projecting through said sleeve for adjusting the degree of friction between said overlapping end portions of said arms of said handle and said corresponding portions of said support.

References Cited by the Examiner
UNITED STATES PATENTS 2,555,630   6/1951   Bishner _____ 317—99 X
2,565,273   8/1951   Shuler et al. _____ 317—99 X
2,966,257   12/1960  Littlejohn _____ 312—244 X ROBERT K. SCHAEFER, Primary Examiner.

M. GINSBURG, Assistant Examiner.